US012112686B2

(12) United States Patent
Li et al.

(10) Patent No.: US 12,112,686 B2
(45) Date of Patent: Oct. 8, 2024

(54) DRIVING METHOD, DRIVING DEVICE, AND DISPLAY TERMINAL OF DISPLAY PANEL

(71) Applicant: TCL CHINA STAR OPTOELECTRONICS TECHNOLOGY CO., LTD., Guangdong (CN)

(72) Inventors: Haoran Li, Guangdong (CN); Xiong Hu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/419,078

(22) PCT Filed: May 21, 2021

(86) PCT No.: PCT/CN2021/095031
§ 371 (c)(1),
(2) Date: Jun. 28, 2021

(87) PCT Pub. No.: WO2022/217698
PCT Pub. Date: Oct. 20, 2022

(65) Prior Publication Data
US 2024/0029627 A1 Jan. 25, 2024

(30) Foreign Application Priority Data
Apr. 12, 2021 (CN) ......................... 202110389762.5

(51) Int. Cl.
*G09G 3/32* (2016.01)
*G09G 3/20* (2006.01)
*G09G 3/30* (2006.01)

(52) U.S. Cl.
CPC ............. *G09G 3/32* (2013.01); *G09G 3/2014* (2013.01); *G09G 3/30* (2013.01);
(Continued)

(58) Field of Classification Search
CPC ............. G09G 3/32; G09G 2320/0626; G09G 2360/16; G09G 3/30; G09G 3/2014; G09G 2320/0271
See application file for complete search history.

(56) References Cited

U.S. PATENT DOCUMENTS

2006/0146827 A1 7/2006 Kim
2021/0020114 A1* 1/2021 Lee ........................ G09G 3/342
2021/0035493 A1 2/2021 Hashimoto

FOREIGN PATENT DOCUMENTS

CN 1885377 A 12/2006
CN 101426313 A 5/2009
(Continued)

*Primary Examiner* — Nitin Patel
*Assistant Examiner* — Cory A Almeida

(57) ABSTRACT

The present application provides a driving method, a driving device, and a display terminal of a display panel. The display panel includes light emitting elements. The driving method includes: obtaining a grayscale data of a displayed image; determining a target current level from preset multiple current levels according to the grayscale data; determining a pulse width modulation signal according to the grayscale data; and driving the light emitting elements to emit light according to the target current level and the pulse width modulation signal.

10 Claims, 3 Drawing Sheets

(52) U.S. Cl.
CPC ............... *G09G 2320/0271* (2013.01); *G09G 2320/0626* (2013.01); *G09G 2360/16* (2013.01)

(56) References Cited

FOREIGN PATENT DOCUMENTS

| | | | |
|---|---|---|---|
| CN | 103413539 | A | 11/2013 |
| CN | 104505055 | A | 4/2015 |
| CN | 105137627 | A | 12/2015 |
| CN | 105575342 | A | 5/2016 |
| CN | 105632421 | A | 6/2016 |
| CN | 105913810 | A | 8/2016 |
| CN | 106297731 | A | 1/2017 |
| CN | 107591131 | A | 1/2018 |
| CN | 107731165 | A | 2/2018 |
| CN | 107735832 | A | 2/2018 |
| CN | 107845368 | A | 3/2018 |
| CN | 108780627 | A | 11/2018 |
| KR | 20060127356 | A | 12/2006 |

* cited by examiner

SDO
| | | | | | | | | | | | | | | | |
|---|---|---|---|---|---|---|---|---|---|---|---|---|---|---|---|
| A | D14 | D13 | D12 | D11 | D10 | D9 | D8 | D7 | D6 | D5 | D4 | D3 | D2 | D1 | D0 |
FIG. 3
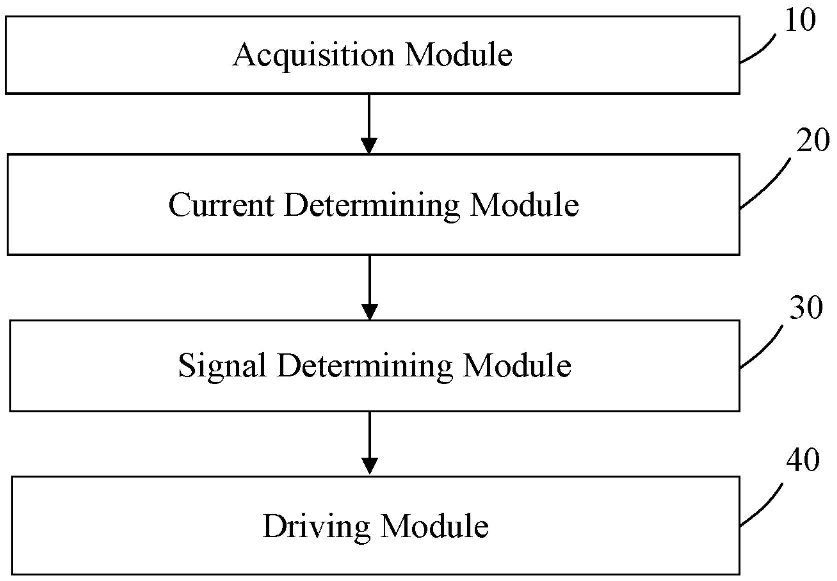
FIG. 4
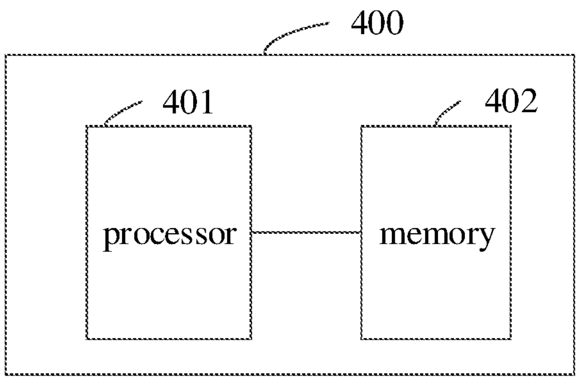
FIG. 5

DRIVING METHOD, DRIVING DEVICE, AND DISPLAY TERMINAL OF DISPLAY PANEL

FIELD OF DISCLOSURE

The present application relates to a field of display panels and in particular, to a driving method and a driving device, and a display terminal of a display panel.

DESCRIPTION OF RELATED ART

In conventional techniques, a driving chip of a mini-LED has only one current, and relies on high currents and low duty cycles to realize low grayscale display functions of a display panel. However, the display panel mostly displays low grayscales, that is, the mini-LED works at a low duty cycle most of the time. Although PWM dimming frequencies are high, an actual utilization rate can be only 20% to 40%, causing a loss of details of the low grayscales displayed.

SUMMARY

The present application provides a driving method, a driving device, and a display terminal of a display panel, which can improve fineness of grayscale images displayed.

The present application provides a driving method of a display panel, wherein the display panel comprises a plurality of light emitting elements, the driving method comprises following steps:

- obtaining a grayscale data of a displayed image;
- determining a target current level from preset multiple current levels according to the grayscale data;
- determining a pulse width modulation signal according to the grayscale data; and
- driving the light emitting elements to emit light according to the target current level and the pulse width modulation signal.

Optionally, the smaller the grayscale data is, the lower the corresponding current level is.

Optionally, the driving method of the display panel further comprises following steps:

- determining a display brightness range of the display panel;
- determining a current range corresponding to the display brightness range; and
- setting the multiple current levels in the current range.

Optionally, the step of setting the multiple current levels in the current range comprises: uniformly selecting multiple current values in the current range, the current values comprising a maximum current value and a minimum current value in the current range; and taking the current values as the current levels.

Optionally, the driving method of the display panel further comprises:

- determining a display grayscale range of the display panel;
- equally dividing the display grayscale range into multiple grayscale ranges; and
- establishing a one-to-one correspondence between the current levels and the grayscale ranges.

Optionally, the displayed image comprises a plurality of pixel subareas, and the grayscale data comprises a subarea grayscale value of each of the pixel subareas; and

- the step of obtaining the grayscale data of the displayed image comprises:

- obtaining a grayscale value of each of pixels in the displayed image; and
- taking each of the pixel subareas as a target pixel subarea, calculating an average grayscale value of all the pixels in the target pixel subarea, and taking the average grayscale value as the subarea grayscale value of the target pixel subarea.

Optionally, the target current level comprises a subarea current level corresponding to each of the pixel subareas; and

- the step of determining the target current level from the preset multiple current levels according to the grayscale data comprises:
- determining a target grayscale range to which the subarea grayscale value of the target pixel subarea belongs according to a grayscale range corresponding to each of the preset current levels; and
- taking the current level corresponding to the target grayscale range as the subarea current level corresponding to the target pixel subarea.

Optionally, the pulse width modulation signal comprises a pulse width modulation sub-signal corresponding to each of the pixel subareas; and

- the step of determining the pulse width modulation signal according to the grayscale data comprises:
- when the subarea current level corresponding to the target pixel subarea is a maximum current level, determining the pulse width modulation sub-signal corresponding to the target pixel subarea according to the subarea grayscale value of the target pixel subarea; and
- when the subarea current level corresponding to the target pixel subarea is not the maximum current level, determining a compensated subarea grayscale value from a preset grayscale compensation table according to the subarea grayscale value of the target pixel subarea, and determining the pulse width modulation sub-signal of the target pixel subarea according to the compensated subarea grayscale value.

Optionally, the light emitting elements are divided into a plurality of backlight subareas, and the backlight subareas are arranged corresponding to the pixel subareas in a one-to-one correspondence; and

- the step of driving the light emitting elements to emit light according to the target current level and the pulse width modulation signal comprises:
- driving the light emitting element in the backlight subarea corresponding to the target pixel subarea to emit light according to the subarea current level and the pulse width modulation sub-signal corresponding to the target pixel subarea.

The present application further provides a driving device of a display panel, wherein the display panel comprises a plurality of light emitting elements, and the driving device comprises:

- an acquisition module configured to obtain a grayscale data of a displayed image;
- a current determining module configured to determine a target current level from preset multiple current levels according to the grayscale data;
- a signal determining module configured to determine a pulse width modulation signal according to the grayscale data; and
- a driving module configured to drive the light emitting elements to emit light according to the target current level and the pulse width modulation signal.

Optionally, the smaller the grayscale data is, the lower the corresponding current level is.

Optionally, the driving device of the display panel further comprises a setting module, wherein the setting module is configured for:

determining a display brightness range of the display panel;

determining a current range corresponding to the display brightness range; and setting the multiple current levels in the current range.

Optionally, the setting module is further configured for:

uniformly selecting multiple current values in the current range, the current values comprising a maximum current value and a minimum current value in the current range; and taking the current values as the current levels.

Optionally, the driving device of the display panel further comprises an establishment module, and the establishment module is configured for:

determining a display grayscale range of the display panel;

equally dividing the display grayscale range into multiple grayscale ranges; and establishing a one-to-one correspondence between the current levels and the grayscale ranges.

Optionally, the displayed image comprises a plurality of pixel subareas, and the grayscale data comprises a subarea grayscale value of each of the pixel subareas; and the acquisition module is also configured for:

obtaining a grayscale value of each of pixels in the displayed image; and taking each of the pixel subareas as a target pixel subarea, calculating an average grayscale value of all the pixels in the target pixel subarea, and taking the average grayscale value as the subarea grayscale value of the target pixel subarea.

Optionally, the target current level comprises a subarea current level corresponding to each of the pixel subareas; and the current determining module is also configured for:

determining a target grayscale range to which the subarea grayscale value of the target pixel subarea belongs according to a grayscale range corresponding to each of the preset current levels; and taking the current level corresponding to the target grayscale range as the subarea current level corresponding to the target pixel subarea.

Optionally, the pulse width modulation signal comprises a pulse width modulation sub-signal corresponding to each of the pixel subareas; and the signal determining module is also configured for:

when the subarea current level corresponding to the target pixel subarea is a maximum current level, determining the pulse width modulation sub-signal corresponding to the target pixel subarea according to the subarea grayscale value of the target pixel subarea; and when the subarea current level corresponding to the target pixel subarea is not the maximum current level, determining a compensated subarea grayscale value from a preset grayscale compensation table according to the subarea grayscale value of the target pixel subarea, and determining the pulse width modulation sub-signal of the target pixel subarea according to the compensated grayscale value.

Optionally, the light emitting elements are divided into a plurality of backlight subareas, and the backlight subareas are arranged corresponding to the pixel subareas in a one-to-one correspondence; and the driving module is also configured for:

driving the light emitting element in the backlight subarea corresponding to the target pixel subarea to emit light according to the subarea current level and the pulse width modulation sub-signal corresponding to the target pixel subarea.

The present application provides a display terminal, comprising a processor and a memory, wherein the processor is electrically connected to the memory, the memory is configured for storing instructions and data, and the processor is configured for executing following steps:

obtaining a grayscale data of a displayed image;

determining a target current level from preset multiple current levels according to the grayscale data;

determining a pulse width modulation signal according to the grayscale data; and driving light emitting elements to emit light according to the target current level and the pulse width modulation signal.

Optionally, the smaller the grayscale data is, the lower the corresponding current level is.

Advantages of the Present Application

The present application can obtain the grayscale data of the displayed image, determine the target current level from the preset multiple current levels according to the grayscale data, and determine the pulse width modulation signal according to the grayscale data, so as to drive the light emitting elements in the display panel to emit light according to the target current level and the pulse width modulation signal, so that different current levels are used to display different grayscales and improve the fineness of different grayscales displayed.

BRIEF DESCRIPTION OF DRAWINGS

The present application will be described in detail below with reference to the accompanying drawings and specific embodiments, so that the technical solutions and other beneficial effects of the present application are easily understood.

FIG. 3 is a schematic diagram illustrating a format of an SDO signal in the driving method of the display panel according to one embodiment of the present application.

FIG. 4 is a schematic diagram illustrating a structure of a driving device of the display panel according to one embodiment of the present application.

FIG. 5 is a schematic diagram illustrating a structure of a display terminal according to one embodiment of the present application.

DETAILED DESCRIPTION OF EMBODIMENTS

Figure 1:
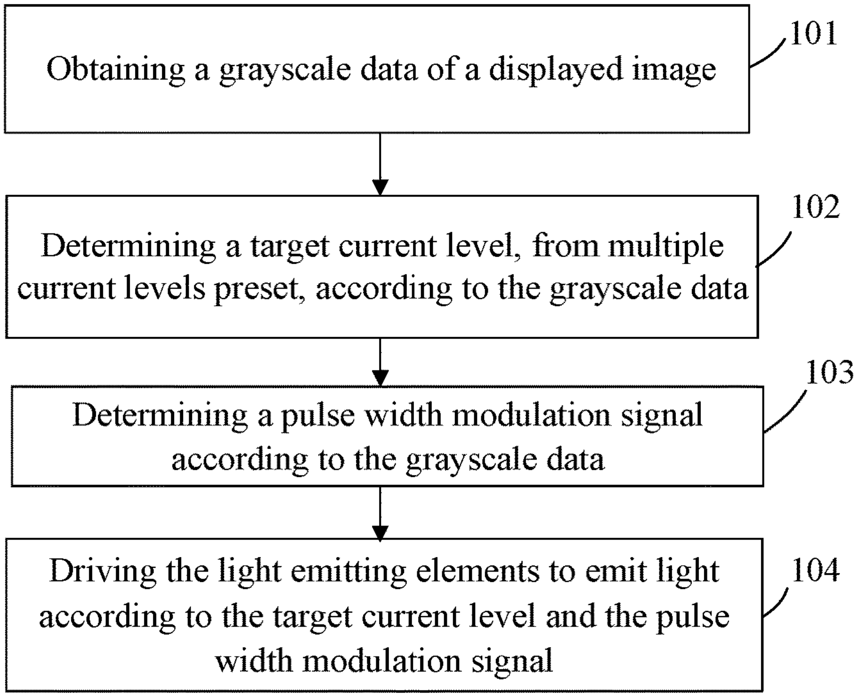
FIG. 1 is a schematic process flow diagram illustrating a driving method of a display panel according to one embodiment of the present application.

The specific structure and functional details disclosed herein are only representative, and are used for the purpose of describing example embodiments of the present application. However, the present application can be realized in many alternative forms, and should not be construed as being limited only to the embodiments set forth herein.

In the description of the present application, it should be understood that the directional terms "center", "lateral", "upper", "lower", "left", "right", "vertical", "horizontal", "top", "bottom", "inner", and "outer" are based on the orientation or positional relationship shown in the accompanying drawings. The directional terms are only for the convenience of describing the present application and simplifying the description, rather than indicating or implying that the device or element referred to must have a specific orientation, be constructed and operated in a specific orientation, and therefore cannot be construed as a limitation to the present application. In addition, the terms "first" and "second" are only used for illustrative purposes, and cannot be understood as indicating or implying relative importance or implicitly indicating the number of indicated technical features. Thus, the features defined with "first" and "second" may explicitly or implicitly include one or more of these features. In the description of the present application, unless otherwise specified, "multiple" means two or more. In addition, the term "comprising" and any variations thereof are intended to cover non-exclusive inclusion.

In the description of this application, it should be noted that the terms "mounted", "connected", and "coupled" should be understood in a broad sense unless otherwise clearly specified and defined. For example, elements can be fixedly connected, or detachably connected, or integrally connected; elements can be a mechanically connected or electrically connected; elements can be directly connected or indirectly connected through an intermediate medium; and internal spaces of two elements can communicate with each other. For those of ordinary skill in the art, the specific meaning of the above-mentioned terms in the present application can be understood on a case-by-case basis.

The terms used herein are only for describing specific embodiments and are not intended to limit the example embodiments. Unless the context clearly specifies otherwise, singular forms "a" and "one" used herein are also intended to include plural forms. It should also be understood that the terms "including" and/or "comprising" used herein indicate the presence of the stated features, integers, steps, operations, units, and/or components, and do not exclude the presence or addition of one or more of other features, integers, steps, operations, units, components, and/or combinations thereof.

The present application is further described below in conjunction with the accompanying drawings and embodiments.

The present application provides a driving method of a display panel. The display panel comprises a plurality of light emitting elements, the light emitting elements can be distributed in an array, the light emitting elements can be divided into a plurality of backlight subareas, and each backlight subarea comprises the at least one light emitting element. The light emitting element can be a mini-LED, a micro-LED, or the like. The display panel also comprises a TCON (timer control register), a controller, and a driving chip. The TCON is electrically connected to the controller, the controller is electrically connected to the driving chip, and the driving chip is electrically connected to the light emitting elements.

Referring to FIG. 1, in the present application, the driving method of the display panel comprises steps 101 to 104, specifically as follows:

Step 101: Obtaining a Grayscale Data of a Displayed Image.

In the present embodiment, the displayed image is composed of multiple pixels, each pixel can display different brightness, and grayscales represent different levels of brightness from the brightest to the darkest. Therefore, according to the brightness of each pixel in the displayed image, TCON can obtain a grayscale value of each pixel and transmit it to the controller.

In a first embodiment, the grayscale data is an average grayscale value of the displayed image. After obtaining the grayscale value of each pixel in the displayed image, the controller calculates the average grayscale value of all the pixels in the displayed image, and takes the average grayscale value as the grayscale data of the displayed image.

In a second embodiment, the displayed image is divided into a plurality of pixel subareas, each pixel subarea comprises at least one pixel, and the grayscale data comprises a subarea grayscale value of each pixel subarea.

In detail, in step 101, the obtaining the grayscale data of the displayed image comprises:

- obtaining a grayscale value of each of the pixels in the displayed image; and
- taking each of the pixel subareas as a target pixel subarea, calculating an average grayscale value of all the pixels in the target pixel subarea, and taking the average grayscale value as the subarea grayscale value of the target pixel subarea.

The controller calculates the average grayscale value of all pixels in each pixel subarea after obtaining the grayscale value of each pixel in the displayed image. The average grayscale value is the subarea grayscale value of the corresponding pixel subarea, so as to obtain the subarea grayscale value of each pixel subarea. The subarea grayscale values of different pixel subareas can be different.

Step 102: Determining a Target Current Level from Preset Multiple Current Levels According to the Grayscale Data.

In the present embodiment, the multiple current levels are preset, multiple grayscale ranges are preset, and a one-to-one correspondence between the multiple current levels and the multiple grayscale ranges is established. The higher the current level, the larger the corresponding grayscale range; the lower the current level, the smaller the corresponding grayscale range; and there is no intersection between the grayscale ranges.

The current levels are set according to a display brightness range of the display panel. Specifically, the driving method further comprises: determining the display brightness range of the display panel; determining a current range corresponding to the display brightness range; and setting the multiple current levels in the current range.

It should be noted that a maximum display brightness in the display brightness range can be set according to actual requirements. For example, the maximum display brightness is set to 1600 nits as required. A minimum display brightness in the display brightness range is brightness when a completely white screen is displayed. The minimum display brightness is, for example, 600 nits. The display brightness range can be determined according to the maximum display brightness and the minimum display brightness. The display brightness range is, for example, from 600 nits to 1600 nits.

Figure 2:
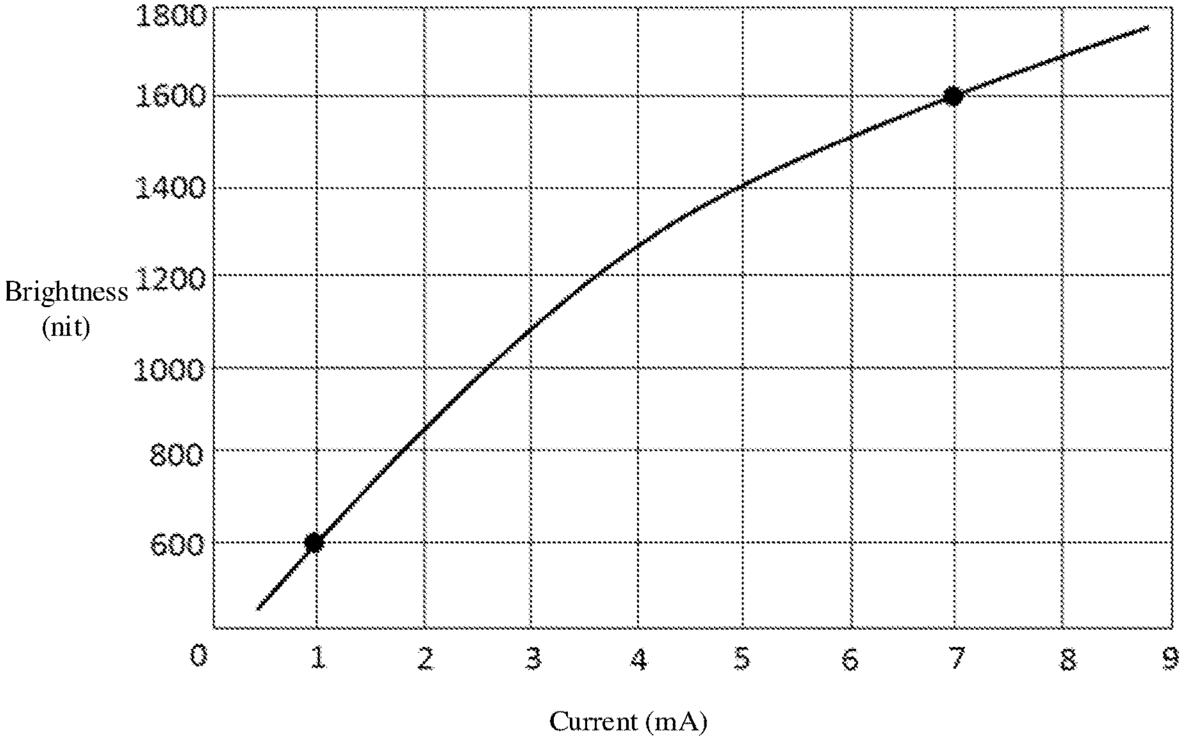
FIG. 2 is a graph illustrating a relationship between brightness and current in the driving method of the display panel according to one embodiment of the present application.

Then, according to a corresponding relationship between light emitting brightness of the light emitting element and a driving current, a current range corresponding to the display brightness range can be determined. As shown in FIG. 2, FIG. 2 is a graph illustrating a relationship between the light emitting brightness of the light emitting element and the driving current. It can be known that the light emitting brightness is positively correlated with the driving current.

That is to say, the greater the light emitting brightness, the higher the driving current; and the lesser the light emitting brightness, the lower the driving current. A maximum current value corresponding to the maximum display brightness and a minimum current value corresponding to the minimum display brightness can be determined through the curve relationship graph, and then the current range can be determined. For example, the maximum current value corresponding to the maximum display brightness of 1600 nits is 7 mA, the minimum current value corresponding to the minimum display brightness of 600 nits is 1 mA, and then the current range is from 1 mA to 7 mA.

After the current range is determined, multiple current values in the current range are set as the current levels. Specifically, the step of setting the current levels in the current range comprises: uniformly selecting multiple current values from the current range, wherein the current values comprise the maximum current value and the minimum current value in the current range; and taking the current values as the current levels.

There are at least two current levels set, that is, the maximum current value and the minimum current value in the current range are respectively set as the current levels. On this basis, it is also possible to select current values at fixed intervals between the maximum current value and the minimum current value to be the current levels. For example, when four current levels are set in the current range of 1 mA to 7 mA, 1 mA is first set as the lowest current level, 7 mA is set as the highest current level, and then the current levels are set at intervals of 1 mA between 1 mA and 7 mA. That is to say, 3 mA and 5 mA are respectively set as the current levels, so that the four current levels are 1 mA, 3 mA, 5 mA, and 7 mA, respectively.

After the current levels are determined, it is also necessary to set the grayscale range corresponding to each current level. Specifically, the driving method further comprises: determining a display grayscale range of the display panel; equally dividing the display grayscale range into multiple grayscale ranges; and establishing a one-to-one correspondence between the current levels and the grayscale ranges.

First, the display grayscale range is determined according to a color depth (bits per pixel) of the displayed image. For example, if the displayed image has a 15-bit color depth, a number of display grayscales is $2^{15}$=32768, and the display grayscale range is from 0 to 32767. Then, according to a number of the current levels, the display grayscale range is equally divided, that is, a number of the grayscale ranges after the division is equal to the number of the current levels, so as to establish a one-to-one correspondence between the multiple current levels and the multiple grayscale ranges. The higher the current levels, the larger the grayscale range; and the lower the current levels, the smaller the grayscale range. For example, the two current levels are 1 mA and respectively, so that the display grayscale range from 0 to 32768 is divided into two grayscale ranges of 16384 to 32767 and 0 to 16383, a corresponding relationship between the current level of 1 mA and the grayscale range of 16384 to 32767 is established, and a corresponding relationship between the current level of 0.5 mA and the grayscale range of 0 to 16383 is established.

In the first embodiment, the controller determines the grayscale range, to which the grayscale data of the displayed image belongs, from the grayscale range corresponding to each current level, and determines the current level corresponding to the grayscale range as the target current level.

In the second embodiment, the displayed image is divided into a plurality of pixel subareas, and the target current level comprises a subarea current level corresponding to each of the pixel subareas.

To be specific, in step 102, the determining the target current level from the preset multiple current levels according to the grayscale data comprises:

determining a target grayscale range to which the subarea grayscale value of the target pixel subarea belongs according to the grayscale range corresponding to each of the preset current levels; and taking the current level corresponding to the target grayscale range as the subarea current level corresponding to the target pixel subarea.

For each pixel subarea, the controller determines the grayscale range to which the subarea grayscale value of the pixel subarea belongs, and takes the current level corresponding to the grayscale range as the subarea current level corresponding to the pixel subarea. The subarea current levels corresponding to different pixel subareas can be different. For example, the subarea grayscale value of a pixel subarea A is 16450, the corresponding grayscale range is from 16384 to 32767, and the corresponding current level is 8 mA, so the subarea current level corresponding to the pixel subarea A is 8 mA; the subarea grayscale value of a pixel subarea B is 30, the corresponding grayscale range is from 0 to 16383, and the corresponding current level is 1 mA, so the subarea current level corresponding to the pixel subarea B is 1 mA.

Step 103: Determining a Pulse Width Modulation Signal According to the Grayscale Data.

When the target current level is different, a different method is used to determine the pulse width modulation signal according to the grayscale data.

In the first embodiment, the controller determines the pulse width modulation signal while determining the target current level according to the grayscale data of the displayed image. If the target current level is the maximum current level among the preset multiple current levels, the grayscale data of the displayed image can be directly converted into the pulse width modulation signal. If the target current level is not the maximum current level among the preset multiple current levels, it is required to check a preset grayscale compensation table to compensate the grayscale data of the displayed image to obtain a compensated grayscale data, and the compensated grayscale data is converted into the pulse width modulation signal.

In the second embodiment, the displayed image is divided into the multiple pixel subareas, and the pulse width modulation signal comprises a pulse width modulation sub-signal corresponding to each of the pixel subareas.

Specifically, in step 103, the determining the pulse width modulation signal according to the grayscale data comprises:

when the subarea current level corresponding to the target pixel subarea is the maximum current level, determining the pulse width modulation sub-signal corresponding to the target pixel subarea according to the subarea grayscale value of the target pixel subarea; when the subarea current level corresponding to the target pixel subarea is not the maximum current level, determining a compensated subarea grayscale value from the preset grayscale compensation table according to the subarea grayscale value of the target pixel subarea, and determining the pulse width modulation sub-signal corresponding to the target pixel subarea according to the compensated subarea grayscale value.

For each pixel subarea, the controller determines whether the subarea grayscale value corresponding to the pixel subarea is within the grayscale range corresponding to the largest current level among the multiple current levels. If affirmative, the pulse width modulation sub-signal corresponding to the pixel subarea is consistent with the subarea grayscale value of the pixel subarea, and the subarea grayscale value of the pixel subarea can be directly converted into the corresponding pulse width modulation sub-signal. If negative, the preset grayscale compensation table is checked to compensate the subarea grayscale value of the pixel subarea to obtain the compensated subarea grayscale value, and the compensated subarea grayscale value is converted into the pulse width modulation signal.

For example, the subarea grayscale value of the pixel subarea A is 16450, the corresponding subarea current level is 8 mA (the maximum current level), and the subarea grayscale value which is 16450 is converted into the pulse width modulation sub-signal corresponding to the pixel subarea A. The subarea grayscale value of the pixel subarea B is 30, and the corresponding subarea current level is 1 mA (not the maximum current level), the grayscale compensation table is checked to determine that the compensated subarea grayscale value is 32, and then the compensated subarea grayscale value which is 32 is converted into the pulse width modulation sub-signal corresponding to the pixel subarea B.

Step 104: Driving the Light Emitting Elements to Emit Light According to the Target Current Level and the Pulse Width Modulation Signal.

It should be noted that after determining the target current level and the pulse width modulation signal, the controller can convert the target current level into a level indicator, and send the level indicator and the pulse width modulation signal to the driving chip through a fixed bit data. For example, an SDO signal is used to send the level indicator and the pulse width modulation signal, the SDO signal has 16 bits, the pulse width modulation signal is at least 12 bits, and the level indicator is at least 1 bit, a number of bits of the level indicator is correlated with the number of the current levels. As shown in FIG. 3, D0 to D14 are pulse width modulation signals. That is to say, the pulse width modulation signal has 15 bits, and A is the level indicator. In other words, the level indicator has 1 bit, and the number of the current levels is two. For example, when the target current level is 8 mA, the corresponding level indicator is determined to be 1; and when the target current level is 1 mA, the corresponding current indicator is determined to be 0. When the number of the current levels is 4, setting can be made such that 2 bits are for the level indicator (i.e., the level indicator consists of 2 bits), and 14 bits are for the pulse width modulation signal. When the number of the current levels is 8, setting can be made such that 3 bits are for the level indicator, and 13 bits are for the pulse width modulation signal.

A corresponding relationship between the level indicators and the current levels is stored in the driving chip. After receiving the SDO signal, the driving chip recognizes the level indicator and the pulse width modulation signal in the SDO signal, and determines the target current level corresponding to the level indicator. For example, when the level indicator is 1, the target current level is determined to be 8 mA, and when the level indicator is 0, the target current level is determined to be 1 mA.

In the first embodiment, the driving chip outputs a current to all the light emitting elements in the display panel according to the target current level and the pulse width modulation signal, so as to drive all the light emitting elements to emit light.

In the second embodiment, the displayed image is divided into the pixel subareas, all light emitting elements in the display panel are divided into a plurality of backlight subareas, each backlight subarea comprises at least one light emitting element, and the backlight subareas are arranged in a one-to-one correspondence with the pixel subareas.

Specifically, in step 104, the driving the light emitting elements to emit light according to the target current level and the pulse width modulation signal comprises:

driving the light emitting element in the backlight subarea corresponding to the target pixel subarea to emit light according to the subarea current level and the pulse width modulation sub-signal corresponding to the target pixel subarea.

For each pixel subarea, the driving chip receives the SDO signal corresponding to the pixel subarea, recognizes the level indicator in the SDO signal, determines the subarea current level of the pixel subarea, and identifies from the SDO signal the pulse width modulation sub-signal corresponding to the pixel subarea, so as to output the current to the light emitting elements in the backlight subarea corresponding to the pixel subarea according to the subarea current level and the pulse width modulation sub-signal corresponding to the pixel subarea to drive the light emitting elements in the backlight subarea to emit light.

For example, for 1 grayscale, the minimum current output to the light emitting element in the conventional technique is $$\frac{1}{2^{15}} \times 8\ \mathrm{mA},$$

and the minimum current output to the light emitting elements in the present embodiment of the present application can be $$\frac{1}{2^{15}} \times 1\ \mathrm{mA}.$$

In the present embodiment, for low grayscales, lower current levels can be used to drive the corresponding light-emitting elements to increase fineness of low grayscale dimming and compensate details for the low grayscales.

The present application can obtain the grayscale data of the displayed image, determine the target current level from the preset multiple current levels according to the grayscale data, and determine the pulse width modulation signal according to the grayscale data, so as to drive the light emitting elements in the display panel to emit light according to the target current level and the pulse width modulation signal, so that different current levels are used to display different grayscales, and the fineness of different grayscales displayed is improved.

Correspondingly, the present application also provides a driving device of the display panel, which can realize all processes of the driving method of the display panel in the above-mentioned embodiments.

As shown in FIG. 4, the present application provides a driving device of a display panel, wherein the display panel comprises a plurality of light emitting elements, and the driving device comprises:

an acquisition module 10 configured to obtain a grayscale data of a displayed image;

a current determining module 20 configured to determine a target current level from preset multiple current levels according to the grayscale data;

a signal determining module 30 configured to determine a pulse width modulation signal according to the grayscale data; and a driving module 40 configured to drive the light emitting elements to emit light according to the target current level and the pulse width modulation signal.

Furthermore, the smaller the grayscale data is, the lower the corresponding current level is.

Furthermore, the driving device comprises a setting module, wherein the setting module is configured for:

determining a display brightness range of the display panel;

determining a current range corresponding to the display brightness range; and setting the multiple current levels in the current range.

Furthermore, the setting module is further configured for:

uniformly selecting multiple current values in the current range, the current values comprising a maximum current value and a minimum current value in the current range; and taking the multiple current values as the current levels.

Furthermore, the driving device further comprises an establishment module, and the establishment module is configured for:

determining the display grayscale range of the display panel;

equally dividing the display grayscale range into multiple grayscale ranges; and establishing a one-to-one correspondence between the current levels and the grayscale ranges.

Furthermore, the displayed image comprises a plurality of pixel subareas, and the grayscale data comprises a subarea grayscale value of each of the pixel subareas;

the acquisition module 10 is also configured for:

obtaining a grayscale value of each of pixels in the displayed image; and taking each of the pixel subareas as a target pixel subarea, calculating an average grayscale value of all the pixels in the target pixel subarea, and taking the average grayscale value as the subarea grayscale value of the target pixel subarea.

Furthermore, the target current level comprises a subarea current level corresponding to each of the pixel subareas;

the current determining module is also configured for:

determining a target grayscale range to which the subarea grayscale value of the target pixel subarea belongs according to the grayscale range corresponding to each of the preset current levels; and taking the current level corresponding to the target grayscale range as the subarea current level corresponding to the target pixel subarea.

Furthermore, the pulse width modulation signal comprises a pulse width modulation sub-signal corresponding to each of the pixel subareas;

the signal determining module is also configured for:

when the subarea current level corresponding to the target pixel subarea is a maximum current level, determining a pulse width modulation sub-signal corresponding to the target pixel subarea according to the subarea grayscale value of the target pixel subarea; and when the subarea current level corresponding to the target pixel subarea is not the maximum current level, determining a compensated subarea grayscale value from a preset grayscale compensation table, and determining the pulse width modulation sub-signal of the target pixel subarea according to the compensated subarea grayscale value.

Furthermore, the light emitting elements are divided into a plurality of backlight subareas, and the backlight subareas are arranged corresponding to the pixel subareas in a one-to-one correspondence;

the driving module is also configured for:

driving the light emitting element in the backlight subarea corresponding to the target pixel subarea to emit light according to the subarea current level and the pulse width modulation sub-signal corresponding to the target pixel subarea.

The present application can obtain the grayscale data of the displayed image, determine the target current level from the preset multiple current levels according to the grayscale data, and determine the pulse width modulation signal according to the grayscale data, so as to drive the light emitting elements in the display panel to emit light according to the target current level and the pulse width modulation signal, so that different current levels are used to display different grayscales, and fineness of different grayscales displayed is improved.

In addition, the present application further provides a display terminal, which may be a device such as a smart phone, a tablet computer, or a television. As shown in FIG. 5, a display terminal 400 comprises a processor 401 and a memory 402. The processor 401 and the memory 402 are electrically connected to each other.

The processor 401 is a control center of the display terminal 400. The processor 401 uses various interfaces and lines to connect various parts of the entire display terminal 400. By running or loading application programs stored in the memory 402, and accessing data stored in the memory 402, the processor 401 executes various functions and processes data of the display terminal, so as to monitor the entire display terminal.

In the present embodiment, the acquisition module 10, the current determining module 20, the signal determining module 30, and the driving module 40 shown in FIG. 4 can be application programs stored in the memory 402. The processor 401 in the display terminal 400 runs the acquisition module 10, the current determining module 20, the signal determining module 30, and the driving module 40 stored in the memory 402, so as to realize various functions. When the acquisition module 10 is executed by the processor 401, the acquisition module 10 is used to obtain the grayscale data of the displayed image. When the current determining module 20 is executed by the processor 401, the current determining module 20 is used to determine the target current level from the preset multiple current levels according to the grayscale data. When the signal determining module 30 is executed by the processor 401, the signal determining module 30 is used to determine the pulse width modulation signal according to the grayscale data. When the driving module 40 is executed by the processor 401, the driving module 40 is used to drive the light emitting elements to emit light according to the target current levels and the pulse width modulation signal.

Figure 6:
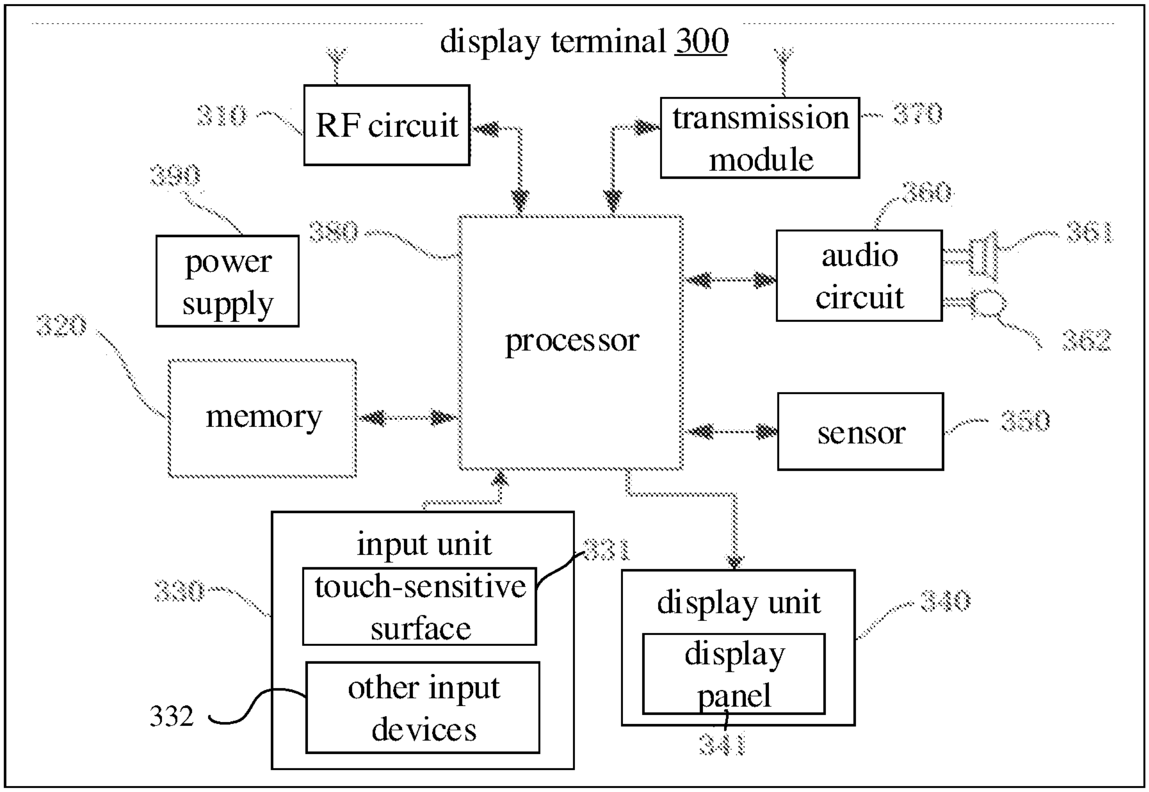
FIG. 6 is a schematic diagram illustrating another structure of the display terminal according to one embodiment of the present application.

Please refer to FIG. 6. FIG. 6 is a schematic diagram of a structure of a display terminal 300 according to one embodiment of the present application. The display terminal 300 can comprise: an RF circuit 310; a memory 320 comprising one or more computer-readable storage media; an input unit 330; a display unit 340; a sensor 350; an audio circuit 360; a speaker 361; a microphone 362; a transmission module 370; a processor 380 with one or more processing cores; a power supply 390; and other components. Those skilled in the art can understand that the structure of the display terminal shown in FIG. 6 does not constitute a limitation to the display terminal, and can comprise more or less components than those shown in the drawing, or can combine certain components, or can have a different arrangement for the components.

The RF circuit 310 is used to receive and send electromagnetic waves, realize a mutual conversion between the electromagnetic waves and electrical signals, and communicate with a communication network or other devices. The RF circuit 310 can comprise various conventional circuit elements for performing these functions, for example, an antenna, a radio frequency transceiver, a digital signal processor, an encryption/decryption chip, a subscriber identity module (SIM) card, a memory, etc. The RF circuit 310 can communicate with various networks such as the Internet, an intranet, and a wireless network, or can communicate with other devices through a wireless network. The aforementioned wireless network can comprise a cellular telephone network, a wireless local area network, or a metropolitan area network. The above-mentioned wireless network can use various communication standards, protocols, and technologies, comprising but not limited to global system for mobile communication (GSM), enhanced data GSM environment (EDGE), wideband code division multiple access (WCDMA), code division access (CDMA), time division multiple access (TDMA), wireless fidelity (Wi-Fi) (e.g., IEEE 802.11a, IEEE 802.11b, IEEE802.11g, and/or IEEE 802.11n, which are standards made by the U.S. Institute of Electrical and Electronics Engineers), voice over internet protocol (VoIP), worldwide interoperability for microwave access (Wi-Max), other protocols for mail, instant messaging and short messages, and any other suitable communication protocols, even those that have not yet been developed.

The memory 320 can be used to store software programs and modules. The processor 380 executes various functional applications and processes data by running the software programs and the modules stored in the memory 320, that is, achieving a function of automatically supplementing light while taking pictures using a front camera. The memory 320 can comprise a high-speed random access memory, and can also comprise a non-volatile memory, such as one or more of a magnetic storage device, a flash memory, or other non-volatile solid-state memory. In some examples, the memory 320 can further comprise remote memories remotely arranged with respect to the processor 380, and these remote memories can be connected to the display terminal 300 via a network. Examples of the aforementioned networks comprise, but are not limited to, the Internet, intranets, local area networks, mobile communication networks, and combinations thereof.

The input unit 330 can be used to receive inputted digital or character information, and input signals from a keyboard, a mouse, a joystick, an optical trackball, or a trackball related to user settings and function control. Specifically, the input unit 330 can comprise a touch-sensitive surface 331 and other input devices 332. The touch-sensitive surface 331, also called a touch screen or a touchpad, can collect a user's touch operations on or near the touch-sensitive surface 331 (for example, the user uses any suitable objects or accessories such as fingers and a stylus to perform operations on or near the touch-sensitive surface 331), and drive a corresponding connection device according to the preset program. Optionally, the touch-sensitive surface 331 can comprise two parts: a touch detection device and a touch controller. The touch detection device detects the user's touch position, and detects signals of the touch operation, and transmits the signal to the touch controller. The touch controller receives touch information from the touch detection device, converts it into contact coordinates, and then sends it to the processor 380, and can receive and execute commands sent by the processor 380. In addition, the touch-sensitive surface 331 can be realized using various types of technologies such as resistive, capacitive, infrared, and surface acoustic wave. In addition to the touch-sensitive surface 331, the input unit 330 can also include other input devices 332. Specifically, the other input device 332 can include, but is not limited to, one or more of a physical keyboard, function keys (such as a volume control button, a switch button, etc.), a trackball, a mouse, or a joystick.

The display unit 340 can be used to display information input by the user or information provided to the user and display various graphical user interfaces of the display terminal 300. These graphical user interfaces can be composed of graphics, text, icons, videos, and any combination thereof. The display unit 340 can comprise a display panel 341. Optionally, the display panel 341 can be a liquid crystal display (LCD), an organic light-emitting diode (OLED), etc. Furthermore, the touch-sensitive surface 331 can cover the display panel 341, and when the touch-sensitive surface 331 detects the touch operation on or near it, information of a touch event is transmitted to the processor 380 to determine a type of the touch event, and then the processor 380 provides a corresponding visual output on the display panel 341 according to the type of the touch event. Although in FIG. 5, the touch-sensitive surface 331 and the display panel 341 are used as two independent components to realize input and output functions. In some embodiments, the touch-sensitive surface 331 and the display panel 341 can be integrated together to realize the input and output functions.

The display terminal 300 can also comprise at least one sensor 350 such as a light sensor, a motion sensor, and other sensors. Specifically, the light sensor can comprise an ambient light sensor and a proximity sensor. The ambient light sensor can adjust the brightness of the display panel 341 according to brightness of the ambient light, and the proximity sensor can turn off the display panel 341 and/or a backlight when the display terminal 300 is moved to be close to the ear. As one type of the motion sensor, a gravity acceleration sensor can detect magnitude of acceleration in various directions (usually three axes), and can detect magnitude and directions of the gravity in a stationary state. The gravity acceleration sensor can be used in applications to identify mobile phone postures (such as switching between a horizontal screen and a vertical screen, related games, a magnetometer posture calibration), vibration recognition related functions (such as pedometers and percussion), etc. As for other sensors, such as gyroscopes, barometers, hygrometers, thermometers, infrared sensors, and the like that can be disposed in the display terminal 300, a detailed description thereof is omitted herein for brevity.

Regarding the audio circuit 360, the speaker 361, and the microphone 362, the microphone 362 can provide an audio interface between the user and the display terminal 300. The audio circuit 360 can transmit electrical signals converted from received audio data to the speaker 361, and the speaker 361 converts the electrical signals into sound signals for output. On the other hand, the microphone 362 converts the collected sound signals into electrical signals, the electrical signals are received by the audio circuit 360 and converted into audio data, and then the audio data are output to the processor 380 to be processed, and then sent to, for example, another terminal through the RF circuit 310. Alternatively, the audio data are output to the memory 320 for further processing. The audio circuit 360 can also comprise an earplug jack to provide communication between a peripheral earphone and the display terminal 300.

The display terminal 300 can help the user to send and receive emails, and browse a web and access streaming media through the transmission module 370 (for example, a Wi-Fi module). The display terminal 300 provides the user with wireless broadband Internet access. Although the transmission module 370 is shown in the drawing, it can be understood that the transmission module 370 is not a necessary component of the display terminal 300 and can be omitted as needed without changing the essence of the present invention.

The processor 380 is a control center of the display terminal 300, which uses various interfaces and lines to connect various parts of the entire mobile phone, runs or executes the software programs and/or the modules stored in the memory 320, and accesses the data stored in the memory 320 to perform various functions of the display terminal 300 and process the data, so as to monitor the entire mobile phone. Optionally, the processor 380 can comprise one or more processing cores. In some embodiments, the processor 380 can integrate an application processor and a modem processor, wherein the application processor mainly handles operating systems, user interfaces, and application programs, and the modem processor mainly deals with wireless communication. It can be understood that the foregoing modem processor can be not integrated into the processor 380.

The display terminal 300 also comprises the power supply 390 (such as a battery) for supplying power to various components. In some embodiments, the power supply 390 can be logically connected to the processor 380 through a power management system, so as to manage charging, discharging, power consumption, and other functions through the power management system. The power supply 390 can also comprise any components such as one or more of a DC or AC power source, a recharging system, a power failure detection circuit, a power converter, an inverter, or a power status indicator.

Although not shown, the display terminal 300 can also comprise a camera (such as a front camera, a rear camera), a Bluetooth module, etc., and a detailed description is omitted herein for brevity. Specifically, in the present embodiment, a display unit of the display terminal 300 is a touch screen display, and the display terminal 300 further comprises the memory 320. As shown in FIG. 4, the acquisition module 10, the current determining module 20, the signal determining module 30, and the driving module 40 can be the application programs stored in the memory 320. The processor 380 in the display terminal 300 runs the acquisition module 10, the current determining module 20, the signal determining module 30, and the driving module 40 stored in the memory 320, so as to realize various functions. When the acquisition module 10 is executed by the processor 401, the acquisition module is used to acquire the grayscale data of the displayed image. When the current determining module 20 is executed by the processor 401, the current determining module 20 is used to determine the target current level from the preset multiple current levels according to the grayscale data. When the signal determining module 30 is executed by the processor 401, the signal determining module 30 is used to determine the pulse width modulation signal according to the grayscale data. When the driving module 40 is executed by the processor 401, the driving module 40 is used to drive the light emitting elements to emit light according to the target current level and the pulse width modulation signal.

In practice, each of the above modules can be realized as an independent entity, or the above modules can be combined arbitrarily or realized as a same entity or several entities. For specific implementation of each of the above modules, please refer to the previous method embodiments, and a detailed description thereof is not repeated here for brevity.

Those of ordinary skill in the art can understand that all or part of the steps in the various methods of the foregoing embodiments can be completed by instructions, or through instructions to control related hardware. The instructions can be stored in a computer-readable storage medium. The instructions are loaded and executed by the processor. Accordingly, the present invention provides a storage medium in which a plurality of instructions are stored, and the instructions can be loaded by a processor to execute the steps in any driving method of the display panel according to the present invention.

The storage medium can include: a read only memory (ROM), a random access memory (RAM), a magnetic disk, or an optical disk, etc.

The instructions stored in the storage medium can execute the steps in any driving method of the display panel provided in the present invention. Therefore, this can achieve the beneficial effects that can be achieved by any driving method of the display panel provided in the present invention. For details, please refer to the previous embodiments, and a detailed description thereof is not repeated here.

For the specific details of each of the above operations, please refer to the above embodiments, and a detailed description thereof is omitted herein for brevity.

What is claimed is:

1. A driving method of a display panel, wherein the display panel comprises a plurality of light emitting elements, the driving method comprises following steps:

obtaining a grayscale data of a displayed image, wherein the displayed image comprises a plurality of pixel subareas, and the grayscale data comprises a subarea grayscale value of each of the pixel subareas, wherein the step of obtaining the grayscale data of the displayed image comprises: obtaining a grayscale value of each of pixels in the displayed image; and taking each of the pixel subareas as a target pixel subarea, calculating an average grayscale value of all the pixels in the target pixel subarea, and taking the average grayscale value as the subarea grayscale value of the target pixel subarea;

determining a target current level from preset multiple current levels according to the grayscale data, wherein the target current level comprises a subarea current level corresponding to each of the pixel subareas, wherein the step of determining the target current level from the preset multiple current levels according to the grayscale data comprises: determining a target grayscale range to which the subarea grayscale value of the target pixel subarea belongs according to a grayscale range corresponding to each of the preset current levels; and taking the current level corresponding to the target grayscale range as the subarea current level corresponding to the target pixel subarea;

determining a pulse width modulation signal according to the grayscale data, wherein the pulse width modulation signal comprises a pulse width modulation sub-signal corresponding to each of the pixel subareas; and the step of determining the pulse width modulation signal according to the grayscale data comprises: when the subarea current level corresponding to the target pixel subarea is a maximum current level, determining the pulse width modulation sub-signal corresponding to the target pixel subarea according to the subarea grayscale value of the target pixel subarea; and when the subarea current level corresponding to the target pixel subarea is not the maximum current level, determining a compensated subarea grayscale value from a preset grayscale compensation table according to the subarea grayscale value of the target pixel subarea, and determining the pulse width modulation sub-signal of the target pixel subarea according to the compensated subarea grayscale value; and driving the light emitting elements to emit light according to the target current level and the pulse width modulation signal, wherein the light emitting elements are divided into a plurality of backlight subareas, and the backlight subareas are arranged corresponding to the pixel subareas in a one-to-one correspondence, wherein the step of driving the light emitting elements to emit light according to the target current level and the pulse width modulation signal comprises: driving the light emitting element in the backlight subarea corresponding to the target pixel subarea to emit light according to the subarea current level and the pulse width modulation sub-signal corresponding to the target pixel subarea.

2. The driving method of the display panel according to claim 1, wherein the smaller the grayscale data is, the lower the corresponding current level is.

3. The driving method of the display panel according to claim 1, further comprising following steps:

determining a display brightness range of the display panel;

determining a current range corresponding to the display brightness range; and setting the multiple current levels in the current range.

4. The driving method of the display panel according to claim 3, wherein the step of setting the multiple current levels in the current range comprises:

uniformly selecting multiple current values in the current range, the current values comprising a maximum current value and a minimum current value in the current range; and taking the current values as the current levels.

5. The driving method of the display panel according to claim 1, further comprising:

determining a display grayscale range of the display panel;

equally dividing the display grayscale range into multiple grayscale ranges; and establishing a one-to-one correspondence between the current levels and the grayscale ranges.

6. A display terminal, comprising a processor and a memory, wherein the processor is electrically connected to the memory, the memory is configured for storing instructions and data, and the processor is configured for executing following steps:

obtaining a grayscale data of a displayed image, wherein the displayed image comprises a plurality of pixel subareas, and the grayscale data comprises a subarea grayscale value of each of the pixel subareas, wherein the step of obtaining the grayscale data of the displayed image comprises: obtaining a grayscale value of each of pixels in the displayed image; and taking each of the pixel subareas as a target pixel subarea, calculating an average grayscale value of all the pixels in the target pixel subarea, and taking the average grayscale value as the subarea grayscale value of the target pixel subarea;

determining a target current level from preset multiple current levels according to the grayscale data, wherein the target current level comprises a subarea current level corresponding to each of the pixel subareas, wherein the step of determining the target current level from the preset multiple current levels according to the grayscale data comprises: determining a target grayscale range to which the subarea grayscale value of the target pixel subarea belongs according to a grayscale range corresponding to each of the preset current levels; and taking the current level corresponding to the target grayscale range as the subarea current level corresponding to the target pixel subarea;

determining a pulse width modulation signal according to the grayscale data, wherein the pulse width modulation signal comprises a pulse width modulation sub-signal corresponding to each of the pixel subareas; and the step of determining the pulse width modulation signal according to the grayscale data comprises: when the subarea current level corresponding to the target pixel subarea is a maximum current level, determining the pulse width modulation sub-signal corresponding to the target pixel subarea according to the subarea grayscale value of the target pixel subarea; and when the subarea current level corresponding to the target pixel subarea is not the maximum current level, determining a compensated subarea grayscale value from a preset grayscale compensation table according to the subarea grayscale value of the target pixel subarea, and determining the pulse width modulation sub-signal of the target pixel subarea according to the compensated subarea grayscale value; and driving the light emitting elements to emit light according to the target current level and the pulse width modulation signal, wherein the light emitting elements are divided into a plurality of backlight subareas, and the backlight subareas are arranged corresponding to the pixel subareas in a one-to-one correspondence, wherein the step of driving the light emitting elements to emit light according to the target current level and the pulse width modulation signal comprises: driving the light emitting element in the backlight subarea corresponding to the target pixel subarea to emit light according to the subarea current level and the pulse width modulation sub-signal corresponding to the target pixel subarea.

7. The display terminal according to claim 6, wherein the smaller the grayscale data is, the lower the corresponding current level is.

8. The display terminal according to claim 6, the processor is further configured for:

determining a display brightness range of the display panel;

determining a current range corresponding to the display brightness range; and setting the multiple current levels in the current range.

9. The display terminal according to claim 8, wherein the processor is further configured for:

uniformly selecting multiple current values in the current range, the current values comprising a maximum current value and a minimum current value in the current range; and taking the current values as the current levels.

10. The display terminal according to claim 6, wherein the processor is further configured for:

determining a display grayscale range of the display panel;

equally dividing the display grayscale range into multiple grayscale ranges; and establishing a one-to-one correspondence between the current levels and the grayscale ranges.

* * * * *